United States Patent [19]

Bielagus

[11] Patent Number: 4,972,960
[45] Date of Patent: Nov. 27, 1990

[54] DISK SCREEN WITH COMPRESSIBLE SPACERS AND FLANGED SURROUNDS

[75] Inventor: Joseph B. Bielagus, Tualatin, Oreg.

[73] Assignee: Beloit Corporation, Beloit, Wis.

[21] Appl. No.: 442,960

[22] Filed: Nov. 29, 1989

[51] Int. Cl.⁵ .............................................. B07B 1/16
[52] U.S. Cl. .................................... 209/672; 209/667; 403/225
[58] Field of Search ............... 209/672, 667, 668, 670, 209/671; 198/382; 403/224, 225; 411/150

[56] References Cited

U.S. PATENT DOCUMENTS

| 4,311,319 | 1/1982 | Synder et al. | 411/150 C |
| 4,653,648 | 3/1987 | Bielagus | 209/672 |
| 4,741,444 | 5/1988 | Bielagus | 209/672 |

*Primary Examiner*—Donald T. Hajec
*Attorney, Agent, or Firm*—Dirk J. Veneman; Raymond W. Campbell

[57] ABSTRACT

A disk screen or like shaft structure is disclosed in which screen disks, surround disks, and spacers are connected together in modular relation. The surround disks have metallic flanges which shield the plastic spacers which are located on either side of the surround disks between the screen dists. The spacers are formed of resilient plastic to allow the disks to deflect from their radial plane and the flanges of the surround disks are sufficiently smaller than the spacers to avoid contact with the screen disks in their deflectred positions. The assembly is placed under a predetermined endwise compression and the module if mounted on a trectangular shaft which is suitably supported for rotation. The assembly is particularly suited for screening a wood chips in the paper making industry where exposed platic parts is undersirable.

7 Claims, 3 Drawing Sheets

DISK SCREEN WITH COMPRESSIBLE SPACERS AND FLANGED SURROUNDS

FIELD OF THE INVENTION

The present invention relates to disk screens in general and disk screen assemblies with flexible spacers in particular.

BACKGROUND OF THE INVENTION

Disk screens are used in the paper making and other industries for screening large flows of materials such as wood chips to separate larger chunks of material from finer pieces. A disk screen usually comprises a plurality of disk assemblies mounted in parallel for rotation in the same direction to form a moving screen. Each disk assembly includes a shaft and a row of parallel disks mounted thereon. The disks of adjoining assemblies interleave with a narrow spacing that permits only finer material to pass through the slots between the disks. The large chips screened out are carried by the rotating disks to the discharge end of the screen.

To effectively separate larger chips from acceptable sized chips it is important that the uniformity of spacing between the disks be maintained. Even a slight misalignment of a disk from the parallel can vary the slot width arbitrarily and allow unacceptable chips through the screen. Furthermore, the misalignment can cause overlapping disks to rub against each other and quickly wear out.

In normal usage, foreign objects such as large chips, rocks or other debris, enter the screen and lodge between the disks, being trapped there if the disks are held rigid. Disk screens employing flexible spacers between disks, such as that disclosed in U.S. Pat. No. 4,653,648, permit the screen disks to flex on the shaft so that oversized chips and other foreign objects will be allowed to pass through the screen, avoiding damage to the screen.

However, it has been discovered that under some conditions significant deterioration of the radially outwardly facing plastic surfaces of the flexible spacers can take place. Polyurethane spacers can experience gouging and pitting during normal use. Exposed plastic surfaces are particularly undesirable in screens utilized in the paper industry and plants which process material for paper coaters, as exposed plastic surfaces are unacceptable to paper makers using coating equipment in their plants.

U.S. Pat. No. 4,741,444 discloses a disk screen with flexible plastic spacers which are shielded from exposure to the material flow by annular surrounds fitted over the spacers. These surrounds have an axial dimension that is less than the axial dimension of the spacers to permit flexing of the spacers and the screen disks without compressing the surrounds. The surrounds are held in place by applying a compressive force to an assembly of disks and spacers to expand the spacers radially to lock the surrounds in place.

A screen disk assembly with surrounds that are more precisely located and that have additional resistance to deformation would be useful and advantageous.

BRIEF DESCRIPTION OF THE INVENTION

The disk screen of this invention has an elongated metallic shaft member with a plurality of screen disks mounted co-rotatively on the shaft member. The screen disks have central shaft receiving openings through which the shaft extends co-axially. A pair of non-metallic spacers are located between and co-axial with adjacent screen disks. A surround disk is located between the spacers and has a circular disk portion and a flange extending peripherally around the disk portion to provide an annular protective surround for the spacers located on either side of the circular disk portion and to provide a radially outwardly facing metallic protective surface for each of the spacers to face material directed on the disk screen between the disks. A means is provided for axially compressively connecting the screen disks, spacers and the surround disk together and for securing the screen disks, spacers and the surround disk into a modular unit which can be mounted on the shaft member.

The flanges of the surround disk act to protect the plastic material of the spacers while still permitting the spacers to flex so that foreign matter does not become lodged between the screen disks.

It is an object of this invention to provide a screen disk arrangement wherein the disks are somewhat elastically supported so as to be able to deflect out of their radial planes on a temporary basis to accommodate lumpy foreign elements and automatically return to their radial planes after the foreign elements have been discharged.

It is a further object of this invention to provide a disk screen with plastic spacers wherein the surfaces of the spacers are protected from wear and erosion by a stiffly supported metallic surface.

A still further object of this invention is to provide a disk screen with rigidly located metallic surrounds for the flexible plastic spacers.

Other objects, features and advantages of the invention will be apparent from the following detailed description taken in conjunction with the accompanying drawings showing a preferred embodiment of the disk screen of the invention.

DESCRIPTION OF THE PREFERRED EMBODIMENT

Figure 1:
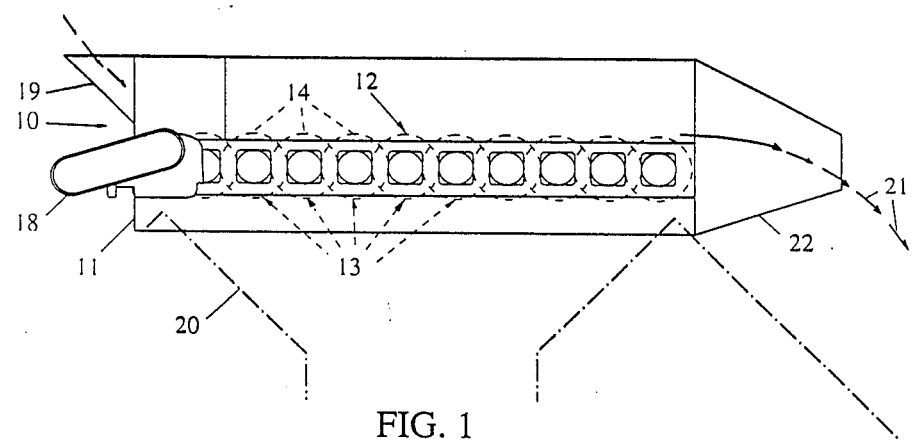
FIG. 1 is a schematic side elevational view of a disk screen apparatus embodying the features of the invention.

Referring now to the FIGS. 1-5 wherein like numbers refer to like parts, FIG. 1 shows a disk screen apparatus 10 having a frame 11 supporting a screening bed 12 which has a series of co-rotating spaced parallel shaft assemblies 13 of cylindrical perimeter and similar length, and each of which has a longitudinal series of concentric metal screen disks 14. The disks 14 of each of the shaft assemblies 13 interdigitate with the disks of the adjacent shafts. Each of the shaft assemblies 13 is rotatably mounted on the frame 11. Unison driving of the shaft assemblies 13 in the same direction, clockwise as seen in FIG. 1, is adapted to be effected by suitable drive means 18.

Figure 3:
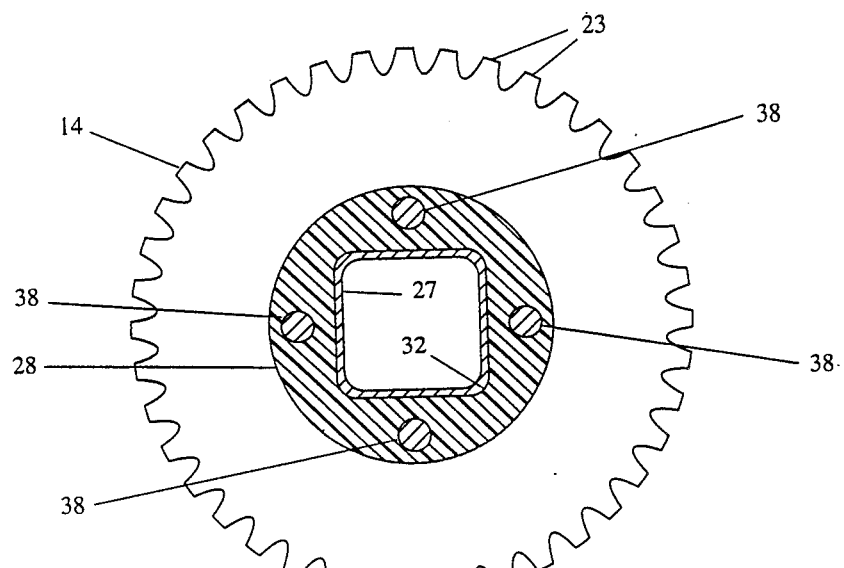
FIG. 3 is a cross-sectional view of the disk screen module taken along section line 3—3 of FIG. 2.
Figure 4:
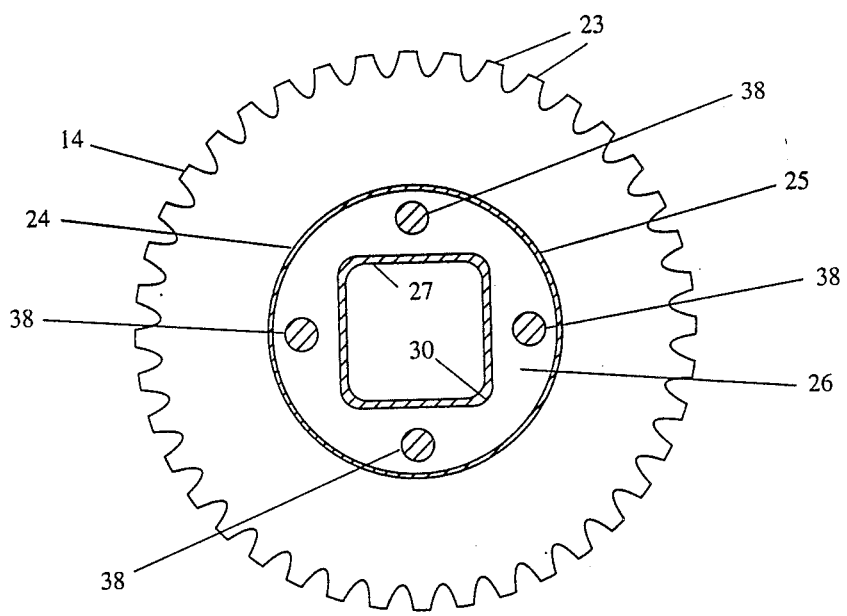
FIG. 4 is a cross-sectional view of the disk screen module taken along section line 4—4 of FIG. 2 on a plane between the disk portion of the surround disk and the spacer to reveal the flange in section.

Discrete material to be screened is delivered to the infeed end of the screening bed 12 by means of a chute 19. Acceptable size particles drop through screening slots defined by and between the interdigitated portions of the disks 14, and are received in a hopper 20. Particles which are too large to pass through the screening slots are advanced to and discharged, as indicated by directional arrows 21, from the rejects end of the screening bed, as by means of an outfeed chute 22. The screening function of the disks 14 may be enhanced by a uniform generally sawtooth configuration of the outer perimeter of the screen disks 14 provided by teeth 23 as best seen in FIGS. 3 and 4. The number of such teeth and their size may be dictated by the particular material to be processed. Although shown as having a relatively sharp, sawtooth shape, the teeth 23 may, depending upon use, be of different geometric forms, such as lobulate or the like.

Each of the disks 14 is spaced from each adjacent disk throughout the entire set of disks in each of the shaft assemblies 13, to provide the desired screening slot spaces between the annular interdigitated areas of the disks.

Figure 2:
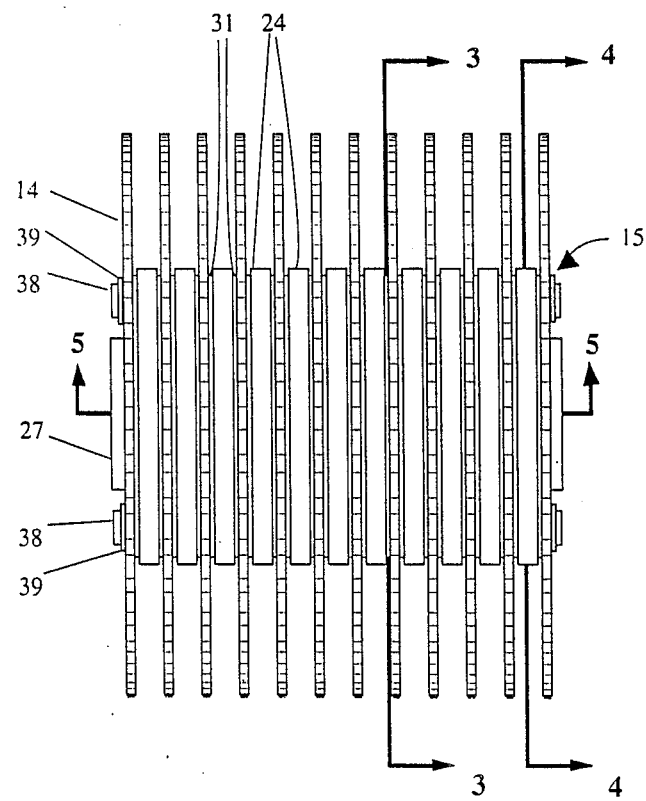
FIG. 2 is a side elevational view of one of the disk screen modules of the apparatus of FIG. 1.
Figure 5:
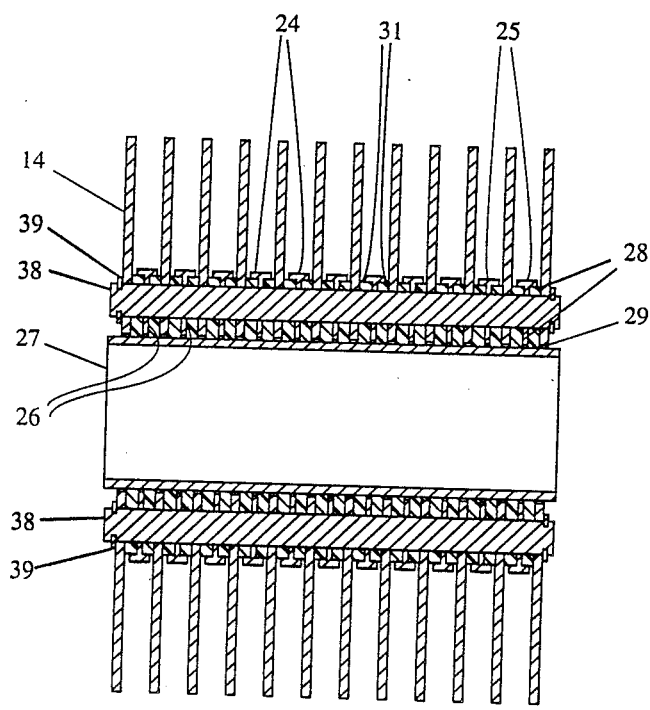
FIG. 5 is a cross-sectional view of the disk screen module taken along section line 5—5 of FIG. 2.

As shown in FIG. 2, a plurality of screen disks 14 are provided which are mounted in a module assembly 15 in axial spaced relation to provide spaces therebetween. The screen disks each extend in relatively true, parallel planes radially from a shaft 27. Shown in FIG. 4 are the surround disks 24 with axially extending flanges 25 which are located between the screen disks 14. Each surround disk 24 has a circular metallic disk portion 26, sufficiently smaller in diameter than the screen disks 14 to allow a desired amount of screen disk to extend beyond the flanges as shown in FIG. 5. The thin flange 25 extends on both sides of the disk portion 26 and runs along the entire perimeter of the disk portion 26.

For maintaining the screen disks 14 accurately spaced in their module 15, non-metallic spacers 28, shown in FIGS. 3 and 5, are mounted between the screen disks 14 on either side of the surround disks 24. These spacers are preferably of polyurethane material such as a polyurethane 90 A Durometer, but may be of any sufficiently compressible hard plastic. The spacers 28 are flat disks with an outer radius slightly less than the inner radius of the flanges 25 of the surround disks 24 and with a central shaft-receiving opening 32 adapted to fit snuggly on the shaft 27. The shaft 27 and openings 32 can be of any shapes, including generally square as shown, triangular or the like.

The plastic spacers 28 have radial faces that press against the radial faces of the screen disks 14 to hold the screen disks in their radial planes. The plastic, however, is sufficiently resilient when subjected to the large forces which would be caused by an object wedging between the screen disks that the screen disks will deflect to allow the object to be discharged. The screen disks then return to their original position, which is in an accurate radial plane from the shaft 27. To provide this compressive restorative force, the series of screen disks 14, surround disks 24, and spacers 28 are compressed by a predetermined axial force by clamping means. FIGS. 2 and 5 show one form of clamping means which is described in detail below. The clamping means acts to axially compressively connect the screen disks 14, surround disks 24, and spacers 28 and secure them in a modular unit which can be supported on the shaft 27.

The flanges 25 of the surround disks 24 each provide an annular ringlike surround which extends around the outer surfaces of the adjacent plastic spacers 28 between each pair of screen disks 14. The flanges 25 essentially close the space on the outer surface of the plastic spacers but in a preferred form the axial extension of the flange 25 on either side of the disk portion 26 of the surround disk 24 is slightly less than the axial dimension of the spacers 28 when compressed, so that a space 31 appears between the ends of the flanges and the surfaces of the adjoining screen disks 14. Thus the outer surfaces of the spacers 28 are substantially fully protected from material between the disks so that abrasive materials, stones and other foreign objects do not chip or scratch the outer surface of the plastic spacers 28. Furthermore, there are minimal exposed plastic surfaces which would be objectionable to paper manufacturers working with coated papers. Since the flanges 25 of the metallic surround disks 24 are slightly shorter in axial length than the spacers 28, the spacers can still function as elastic separators to permit deflection of the screen disks 14. The flanges 25 protrude from the disk portion 26 of the surround disks 24 a distance sufficiently shorter than the axial length of the plastic spacers 28 so that even when the spacers 28 are compressed in their module form, there is still a slight space 31 between the ends of the flanges and the screen disks 14 so that the screen disks 14 may tilt slightly against the plastic spacers. Properly sized flanges 25 will allow the screen disks to flex to a certain degree but will restrict flexing beyond that point. The allowed flexing permits the discharge of chips, rocks and other foreign objects, but limits the flexing so that the disks do not break due to interference with one another. In a preferred form, the flanges of the surround disks 24 are sized so that after the compression of the spacers 28, there is still clearance of approximately 0.381 mm between the ends of the flanges 25 and the screen disks 14. If desired, the spacers 28 may be of sufficient diameter such that when the spacers 28 are compressed when the module is assembled the spacers will be forced into a tight engagement with the inner surfaces of the flanges 25. The circular metallic disk portion 26 of the surround disk 24 acts to rigidly stiffen the surrounding flange 25 such that impinging chips, rocks or other foreign objects will not cause any deformation of the flanges or the spacers 28 which would result in a change in the elastic properties of the spacers and as a result disturb the accurately spaced configuration of the screen disks 14 in the module 15.

While a preferred form of the surround disks 24 requires that the flanges 25 be slightly shorter than the spacers 28 such that when the spacers are placed under axial compression there will still be clearance at the end of the flanges, in some forms it may be desirable to make the flanges of the surround disks 24 of a length so that the screen disk touches the end of the flanges when the spacers 28 are compressed. This still will allow deflection of the screen disks 14 which will then act against both the surround disk flanges 25 and the spacers 28.

The screen disks 14 have inner edges defining central shaft-receiving openings 29, and the surround disks 24 have central shaft-receiving openings 30 both of which are sized so that they do not seat firmly on the shaft 27, but allow a small space between the shaft 27 and the screen disks 14, and the surround disks 24. The spacers 28 are sized so that they can be slid over the shaft 27 which may be of any desired length but is commonly about ten feet long to accommodate up to 144 screen disks 14. Shaft assemblies of this size are especially suitable for disk screens for screening wood chips as used in the paper making industry. When the spacers 28 are slid over the rectangular shaft 27 a fairly small sliding space occurs between the screen disks 14 and the surround disks 24 and the shaft 27 but essentially the disks center the assembly on the shaft so that stable positioning of the parts occurs during rotation, and vibration or oscillation is prevented.

The module is compressed as shown in FIG. 2. An axial force is applied on opposite ends of the module against the end screen disks 14, and pins 38 extend through pin holes in the spacers 28, surround disks 24, and screen disks 14, the holes preferably being quadrilateraly spaced a fixed distance from the centers of the disks. Locking rings 39 rest in grooves at the ends of the pins 38 and compressively hold the module 15 into a tightly compressed unit. The rectangular shaft 27 is suitably mounted on a rotational shaft so that the entire unit will rotate in proper relationship to adjacent modular units as illustrated in FIG. 1.

It should be noted that screen disk modules may be constructed of any desired length, and that the screen disks and surround disks may be of any desired diameters to appropriately screen out material of a determined size.

While the present invention has been shown on what commonly is known as a flat screen, those skilled in the art will recognize that it can be used on other types of disks screens such as V-screens, split-flow screens and the like.

It is understood that the invention is not confined to the particular construction and arrangements of parts herein illustrated and described but embraces such modified forms thereof as come within the scope of the following claims.

I claim:

1. A disk screen rotatable shaft assembly comprising: an elongate shaft member;
   a plurality of metallic screen disks mounted co-rotatively on the shaft member and having central shaft-receiving openings through which the shaft extends co-axially;
   a pair of non-metallic resilient spacers located between and co-axial with adjacent screen disks;
   a surround disk located between the spacers of each pair of spacers, said surround disk having a circular disk portion and a flange extending peripherally around the disk portion to provide an annular protective surround for the spacers located on the sides of the circular disk portion and providing a radially outwardly facing metallic protective surface for each of the spacers to face material directed onto the disk screen between the disks; and
   means for axially compressively connecting the screen disks, surround disk, and spacers together, and for securing the screen disks, surround disk, and spacers into a modular unit mounted on the shaft member.

2. A disk screen rotatable shaft assembly constructed in accordance with claim 1:
   wherein the flanges of the surround disks are of an axial length slightly less than the axial length of the spacers so that deflection of the disks out of their radial planes will compress the spacers but not the flanges.

3. A disk screen rotatable shaft assembly constructed in accordance with claim 1;
   wherein the spacers are of a compressible hard plastic.

4. The disk screen rotatable shaft assembly of claim 1 wherein portions of the circular disk portion of the surround disk define a central shaft receiving opening through which the shaft extends axially.

5. The disk screen rotatable shaft assembly of claim 1 wherein:
   the circular disk portion of the surround disk has portions defining four circular pin holes quadrilaterally spaced around the disk portion a spaced distance from the center of the surround disk to permit the insertion of pins for applying a compressive force to the modular unit.

6. In a disk screen rotatable shaft assembly having an elongate shaft member, a plurality of metallic screen disks mounted co-rotatively on the shaft member and having central shaft-receiving openings through which the shaft extends axially, the improvement comprising:
   a pair of non-metallic resilient spacers located between and co-axial with adjacent screen disks;
   a surround disk located between the spacers having a circular disk portion and a flange extending peripherally around the disk portion to provide an annular protective surround for the spacers wherein the circular disk portion acts to restrict deformation of the surround and the surround provides a radially outwardly facing metallic protective surface for each of the spacers to face material directed onto the disk screen between the disks; and
   a means for axially compressively connecting the screen disks, surround disks, and spacers together, and for securing the screen disks, surround disks, and spacers into a modular unit mounted on the shaft member.

7. A module for a disk screen rotatable shaft assembly comprising:
   a plurality of metallic screen disks having central shaft-receiving openings;
   a pair of non-metallic resilient spacers located between and co-axial with adjacent screen disks;
   a surround disk for the spacers of each pair, the surround disk having a circular disk portion located between the spacers of the pair and a flange extending peripherally around the disk portion to provide an annular protective surround for the spacers located on each side of the circular disk portion and providing a radially outwardly facing metallic protective surface for each of the spacers to face material directed onto the disk screen between the disks; and
   means for axially compressively connecting the screen disks, surround disks, and spacers together, and for securing the screen disks, surround disks, and spacers into a modular unit to facilitate mounting on a shaft.

* * * * *

UNITED STATES PATENT AND TRADEMARK OFFICE
CERTIFICATE OF CORRECTION

PATENT NO. : 4,972,960

DATED : November 27, 1990

INVENTOR(S) : Joseph B. Bielagus

It is certified that error appears in the above-identified patent and that said Letters Patent is hereby corrected as shown below:

Abstract:

Line 6: "dists" should read --disks--

Line 11: "predertermined" should read --predetermined--

Lines 12 & 13: "trectangular" should read --rectangular--

Line 12: "if" should read --is--

Line 14: "a" should read --of--

Line 15: "platic" should read --plastic--

Signed and Sealed this

Seventh Day of April, 1992

*Attest:*

HARRY F. MANBECK, JR.

*Attesting Officer*      *Commissioner of Patents and Trademarks*